United States Patent Office 3,166,470
Patented Jan. 19, 1965

3,166,470
METHOD OF PROTECTING ORGANIC MATERIALS AGAINST FUNGI WITH DODECYL AMIDINO-CARBAMATES
Daniel Elmer Nagy, Stamford, Conn., assignor to American Cyanamid Company, Stamford, Conn., a corporation of Maine
No Drawing. Filed Apr. 3, 1963, Ser. No. 270,172
6 Claims. (Cl. 167—22)

The present invention relates to new fungicidal compositions comprising a dodecyl amidinocarbamate and to methods of protecting agricultural, organic and related articles from attack by micro-organisms.

As used in this specification, the term "fungicide" is meant to include not only a material possessing the property of destroying fungi, but also the property of inhibiting the germination of the spores of the fungi.

According to the present invention, it has been found that compositions comprising a dodecyl amidinocarbamate or its acid addition salt possess unique fungicidal properties. These amidinocarbamate-containing compositions are particularly effective in preventing and inhibiting fungus growth on seeds, soils, plants, fruits, cotton, wood and other organic matter.

The dodecyl amidinocarbamate employed as the active component in the present invention can be represented by the structure:

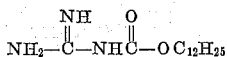

The acid addition salts of the amidinocarbamate such as, for instance, the hydrochloride, the sulfate or the acetate salt and equivalents thereof, are within the purview of the present invention.

Fungicidal compositions can be prepared either as a suspension in a suitable non-solvent or as a dust. Suspensions or dispersions of the amidinocarbamate in a non-solvent, such as water, are advantageously employed in treating plant foliage.

It has been found that for maximum protection of fruits, seeds, plant tubers and other organic materials during storage, it is advantageous to employ a solution of the fungicide in oil, which solution is then emulsified in water. The oil that can be used as a solvent for the fungicide are hydrocarbons, such as for instance benzene and toluene. Halogenated hydrocarbons such as chlorobenzene, chloroform, fluorotrichloromethane and dichlorodifluoromethane are also contemplated.

The aerosol method may further be used to apply the compounds of the present invention to foliage. Solutions for the aerosol treatment are prepared either by dissolving the chemical directly in a highly volatile liquid carrier, such as trifluoromethane, or by dissolving the fungicide in a less volatile solvent, such as benzene, and then admixing such solution with the highly volatile liquid aerosol carrier.

Dusts may be prepared by mixing the amidinocarbamate with dusting materials as, for example, clay, bentonite, pumice, fuller's earth, pyrophyllite and equivalents thereof. Thus, seeds for instance can be protected from soil organisms harmful to them by incorporating the compounds with a solid carrier and admixing the composition with the seed as by tumbling or rotating.

A wide range of fungicidal compound to inert carrier or diluent, usually up to about 10% by weight of the compound, based on the weight of the inert additive, can advantageously be employed. However, it has been found that for aqueous dispersion preparations from 0.01% to 1.0% of the active ingredient is adequate. For dust compositions, however, 5% of the active ingredient are effective for most applications.

In an aqueous suspension, the over-all composition may contain a dispersing agent for the compound. In general, any commercially available dispersing or surface-active agent can be utilized in forming such dispersions. Illustrative of the dispersants are: the fatty acid esters of polyhydric alcohols, such as "Span," or the alkylarylpolyether alcohols and equivalents thereof. Usually, from one to five parts of the dispersing agent per 100 parts of the fungicide constitutes a satisfactory range.

The invention will be further illustrated by the following examples, but it is not limited thereto. Unless otherwise noted, the parts are by weight.

EXAMPLE 1

*Preparation of n-dodecyl amidinocarbamate sulfate*

To a mixture of 22 parts of cupric acetate, 150 parts (by volume) of n-dodecanol, and 25 parts (by volume) of benzene are added 16.8 parts of dicyandiamide. The mixture is heated under reflux at atmospheric pressure on a steam bath for twenty-eight hours. Cooling and filtration give a mixture of colored solids. Repeated trituration with portions of warm water yields n-dodecyl amidinopseudourea as a lavender copper acetate complex which is difficult to dry.

10.3 parts of n-dodecyl amidinopseudourea copper acetate complex is next dissolved in 50 parts of warm isopropanol. Mixing with 50 parts of 30% aqueous ammonium sulfate solution gives two layers. The upper layer is separated and adjusted to a pH slightly acid to phenol red by dropwise addition of 10 N sulfuric acid. After approximately twenty hours at room temperature, precipitation of crystals occurs. The mixture is then filtered, yielding 5.2 parts of the sulfate salt. Recrystallization from 13 parts of glacial acetic acid gives an insoluble fraction and 3.1 parts of product, having a melting point of 176.5° C. to 177° C., which analyzes as the hemihydrate.

Calculated for $C_{28}H_{61}N_6O_{8.5}S$: C, 51.76; H, 9.46; N, 12.94; S, 4.93. Found: C, 51.90; H, 8.95; N, 12.78; S, 4.87.

EXAMPLE 2

*Preparation of lauryl amidinocarbamate sulfate*

To a suitable reaction vessel is added a mixture of 44 parts of cupric acetate, 50 parts (by volume) of benzene and 300 parts (by volume) of lauryl alcohol. This mixture is azeotroped to remove 4.6 parts of water. To the mixture are next added 33.6 parts of dicyandiamide and the contents are then heated at 95° C. for forty-eight hours. On cooling resultant violet solution to room temperature, a red precipitate identified as the copper acetate complex of a lauryl pseudourea is recovered. The latter is filtered, washed with hexane and air dried.

The copper complex is treated with 400 parts (by volume) of isopropanol and 70 parts (by volume) of 30% aqueous ammonium sulfate solution at 5° C. To the mixture are added 60 parts (by volume) of 10 N sulfuric acid. Cupric sulfate is filtered and the filtrate is neutralized with sodium hydroxide. Resultant mixture is next filtered and vacuum evaporated to obtain a pasty material.

To dissolve the latter material, a mixture of water and isopropanol is employed. Fifty parts of ammonium sulfate and 25 parts of 10 N sulfuric acid are next added. After forty-five minutes at room temperature, a precipitate of the sulfate salt of lauryl amidinocarbamate is recovered and analysis is substantially the same as in Example 1 above.

EXAMPLE 3

*Preparation of n-dodecyl amidinocarbamate hydrochloride*

Approximately 10 parts of crude n-dodecyl amidinocarbamate sulfate as prepared in Example 1 is heated with 500 parts of 1.2 N hydrochloric acid. The mixture becomes cloudy. On cooling, a white flocculent precipitate appears. After suction filtration and drying over sodium hydroxide, a yield of 6.2 parts of n-dodecyl amidinocarbamate hydrochloride is obtained having a melting point of 127.5° C. to 129.5° C.

Calculated for $C_{14}H_{30}N_3O_2Cl$: C, 54.61; H, 9.82; N, 13.64; O, 10.40; Cl, 11.52. Found: C, 54.98; H, 9.33; N, 13.64; O, 10.67; Cl, 11.78.

EXAMPLE 4

*Preparation of n-dodecyl amidinocarbamate acetate*

Two parts of the hydrochloride prepared in Example 3 above are mixed with 38 parts of aqueous sodium hydroxide to a final pH of about 11. On heating, the mixture becomes sudsy; the free base is not soluble and can, if desired, be recovered by filtration. However, the acetate salt is prepared by adding to the free base glacial acetic acid dropwise to a pH of about 5; the solid does not dissolve. The mixture is next cooled and the solid filtered and washed with water. Drying over sodium hydroxide in vacuum yields 1.9 parts of crude product having a melting point of 108° C. to 114° C. Three recrystallizations from about 15 parts of ethyl acetate yield 1.1 parts of white, fluffy crystals having a melting point of 111.0° C. to 112.0° C.

Calculated for $C_{16}H_{33}O_4N_3$: C, 57.98; H, 10.04; N, 12.65. Found: C, 58.12; H, 9.97; N, 12.90.

EXAMPLE 5

In this example, an aqueous formulation of each of the compounds prepared above is tested in the following manner.

Flats containing four cucumber plants and five tomato plants are employed as test containers. All plants are sixteen days old from time of transplanting as seedlings.

Test compounds are prepared as 100 parts per million solutions in a 50/50 acetone/water mixture. The flats are then sprayed. They are allowed to dry and next inoculated with a mixed inoculum of *Colletotrichum lagenarium* and *Phytophthora infestans*, Cucumber anthrachose and Tomato late blight, respectively. Both inoculated flats and controls are then immediately placed in a constant temperature cabinet at 65° F. and a saturated relative humidity for forty-eight hours.

The flats are then removed to the greenhouse and observations are recorded. The controls of both cucumber and tomato are killed from disease. However, the results of the spray compositions employing the compounds of Examples 1 to 4 above, are summarized in Table I below.

TABLE I

| Compound | Plant Species | Protection Afforded, percent |
|---|---|---|
| Example 1 | Cucumber | 97.0 |
|  | Tomato | 92.0 |
| Example 2 | Cucumber | 96.0 |
|  | Tomato | 91.0 |
| Example 3 | Cucumber | 93.4 |
|  | Tomato | 94.0 |
| Example 4 (n-Dodecyl Amidino-Carbamate). | Cucumber | 95.5 |
|  | Tomato | 95.5 |
| Example 4 (Acetate Salt) | Cucumber | 96.0 |
|  | Tomato | 96.0 |

EXAMPLE 6

In this example, the procedure of Example 5 is repeated, except that rapid dispersion of the active compounds is attained by admixture therewith of 0.01 part of an alkylarylpolyether alcohol (Triton X–100).

Similar results are obtained.

I claim:

1. A method for the protection of organic materials susceptible to attack by fungi which comprises: applying to said organic material a preparation comprising a minor amount of a dodecyl amidinocarbamate selected from the group consisting of n-dodecyl amidinocarbamate, n-dodecyl amidinocarbamate hydrochloride, n-dodecyl amidinocarbamate acetate and n-dodecyl amidinocarbamate sulfate, and a major amount of a fungicidal adjuvant therefor, said adjuvant comprising a surface-active agent.

2. A method according to claim 1 in which an aqueous suspension of the amidinocarbamate is provided.

3. A method according to claim 1 in which the active compound is: n-dodecyl amidinocarbamate.

4. A method according to claim 1 in which the active compound is: n-dodecyl amidinocarbamate hydrochloride.

5. A method according to claim 1 in which the active compound is: n-dodecyl amidinocarbamate acetate.

6. A method according to claim 1 in which the active compound is: n-dodecyl amidinocarbamate sulfate.

References Cited in the file of this patent

UNITED STATES PATENTS

| 2,599,737 | Adelson | June 10, 1952 |
| 3,099,641 | Caldwell et al. | July 30, 1963 |